US009400790B2

(12) United States Patent
Yasrebi et al.

(10) Patent No.: US 9,400,790 B2
(45) Date of Patent: Jul. 26, 2016

(54) METHODS AND SYSTEMS FOR CUSTOMIZED CONTENT SERVICES WITH UNIFIED MESSAGING SYSTEMS

(75) Inventors: Mehrad Yasrebi, Austin, TX (US); James Jackson, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 844 days.

(21) Appl. No.: 12/634,626

(22) Filed: Dec. 9, 2009

(65) Prior Publication Data
US 2011/0137918 A1 Jun. 9, 2011

(51) Int. Cl.
*G06F 17/30* (2006.01)
*G10L 15/26* (2006.01)

(52) U.S. Cl.
CPC ...... *G06F 17/30035* (2013.01); *G06F 17/3028* (2013.01); *G10L 15/26* (2013.01)

(58) Field of Classification Search
CPC .......... G06F 17/30035; G06F 17/3028; G10L 15/26
USPC ....................................................... 707/711
See application file for complete search history.

(56) References Cited

U.S. PATENT DOCUMENTS

| | | | |
|---|---|---|---|
| 6,345,253 B1 * | 2/2002 | Viswanathan .... G06F 17/30746 704/251 |
| 6,873,687 B2 * | 3/2005 | Smith, II ..................... 379/88.14 |
| 7,133,837 B1 * | 11/2006 | Barnes, Jr. ................. 705/26.81 |
| 7,421,387 B2 * | 9/2008 | Godden ......................... 704/200 |
| 7,945,585 B1 * | 5/2011 | Sorkin et al. ................. 707/784 |
| 8,380,741 B2 * | 2/2013 | Ishikawa et al. .............. 707/776 |
| 8,583,433 B2 * | 11/2013 | Webb et al. .................... 704/235 |
| 8,601,004 B1 * | 12/2013 | Mahadevan ........ G06Q 30/0261 705/14.53 |
| 2001/0027478 A1 * | 10/2001 | Meier et al. .................... 709/206 |
| 2002/0052870 A1 * | 5/2002 | Charlesworth ... G06F 17/30017 |
| 2002/0154817 A1 * | 10/2002 | Katsuyama et al. .......... 382/190 |
| 2003/0018659 A1 * | 1/2003 | Fuks ................. G06F 17/30646 715/230 |
| 2003/0028603 A1 * | 2/2003 | Aktas et al. ................... 709/206 |
| 2003/0123622 A1 * | 7/2003 | Gifford et al. ............. 379/88.13 |
| 2004/0098386 A1 * | 5/2004 | Thint et al. ......................... 707/3 |
| 2004/0158558 A1 * | 8/2004 | Koizumi ........... G06F 17/30707 |
| 2005/0004874 A1 * | 1/2005 | Gilmour et al. .................. 705/51 |
| 2005/0105712 A1 * | 5/2005 | Williams et al. .......... 379/265.02 |
| 2007/0078708 A1 * | 4/2007 | Yu et al. ........................... 705/14 |
| 2007/0078709 A1 * | 4/2007 | Rajaram ............................ 705/14 |
| 2007/0208567 A1 * | 9/2007 | Amento et al. ................ 704/270 |
| 2007/0219856 A1 * | 9/2007 | Ahmad-Taylor ...... G06Q 10/103 705/301 |
| 2008/0263583 A1 * | 10/2008 | Heath ............................... 725/32 |
| 2009/0157658 A1 * | 6/2009 | Bonev et al. ....................... 707/5 |
| 2009/0290692 A1 * | 11/2009 | Fong et al. .................. 379/88.14 |
| 2010/0035640 A1 * | 2/2010 | Lew et al. ...................... 455/466 |
| 2010/0094826 A1 * | 4/2010 | Rouhani-Kalleh ........... 707/705 |
| 2010/0106498 A1 * | 4/2010 | Morrison ...................... 704/235 |
| 2010/0145808 A1 * | 6/2010 | Hilbert et al. .............. 705/14.66 |

(Continued)

*Primary Examiner* — Brannon W Smith
(74) *Attorney, Agent, or Firm* — Hartman & Citrin LLC

(57) ABSTRACT

Profile information and other information about users are received from information sources into a unified messaging platform. Multimedia messages and files for users are converted to text using approximation algorithms. Text and multimedia messages and files for users are analyzed using confidence scores and thresholds. Profile information, file keyword information and message keyword information are used to identify and transmit a limited amount of information about users to information consumers and content service providers. Information consumers and content service providers can customize their content that is presented to users.

12 Claims, 4 Drawing Sheets

(56) References Cited

U.S. PATENT DOCUMENTS

| | | | |
|---|---|---|---|
| 2010/0153325 A1* | 6/2010 | Amoroso et al. | 706/46 |
| 2010/0272359 A1* | 10/2010 | Fosseide et al. | 382/182 |
| 2011/0016118 A1* | 1/2011 | Edala et al. | 707/730 |
| 2011/0055196 A1* | 3/2011 | Sundelin et al. | 707/711 |
| 2011/0320467 A1* | 12/2011 | Consul | G06Q 10/107 707/755 |
| 2013/0027738 A1* | 1/2013 | Dowling et al. | 358/1.14 |
| 2013/0035937 A1* | 2/2013 | Webb et al. | 704/235 |
| 2015/0220980 A1* | 8/2015 | Morrison | G10L 15/265 705/14.49 |

\* cited by examiner

METHODS AND SYSTEMS FOR CUSTOMIZED CONTENT SERVICES WITH UNIFIED MESSAGING SYSTEMS

FIELD OF THE INVENTION

The present application relates to unified messaging systems and, in particular, methods and systems for customized content services.

BACKGROUND

Communications over the Internet and other networks are implemented under different messaging techniques. The different messaging techniques include email, smart messaging service (SMS), facsimile (FAX), voicemail, video messaging, and other formats, and each messaging technique may involve a dedicated storage system. Integration of the messaging techniques for storage, retrieval and management by a single messaging device such as a unified messaging (UM) platform poses advantages and efficiencies. Some messaging solutions (e.g., the "Google Voice" product) can support audio transcriptions and may be used along with search engines, etc. There are advantages for such messaging devices to consume and/or provide information about their subscribers from and to other systems. Such advantages include providing better targeted advertising and content services. However, efficient techniques for sharing relevant and concise information among such platforms, devices and systems are needed to improve delivery of targeted content to users. Information that is stored in unified messaging platforms for users can be in the form of text, facsimile, audio, video, etc. Such information, in its original form, cannot be shared with information consumers and content service providers.

SUMMARY

Systems, methods, and computer readable products in accordance with the present invention are described herein. Some embodiments are summarized in this section.

In one embodiment, a selection of profile information, text information, and multimedia information for users is received. Multimedia information is converted to text information. Confidence scores and thresholds are used to select keywords about the users.

Many other features and embodiments of the present invention will be apparent from the accompanying drawings and from the following detailed description.

BRIEF DESCRIPTION OF THE DRAWINGS

The present disclosure is illustrated by way of example and not limited in the figures of the accompanying drawings in which like references indicate similar elements.

DETAILED DESCRIPTION

In the following description, for purposes of explanation, numerous specific details are set forth in order to provide a thorough understanding of the description. It will be apparent, however, to one skilled in the art that embodiments of the disclosure can be practiced without these specific details. In some instances, structures and devices are shown in block diagram form in order to avoid obscuring the description. In other instances, functional block diagrams are shown to represent data and logic flows.

Reference in this specification to "one embodiment," "an embodiment," "other embodiments," or the like means that a particular feature, structure, or characteristic described in connection with the embodiment is included in at least one embodiment of the disclosure. The appearances of, for example, the phrase "in one embodiment" in various places in the specification are not necessarily all referring to the same embodiment, nor are separate or alternative embodiments mutually exclusive of other embodiments.

Moreover, whether or not there is express reference to an "embodiment" or the like, various features are described that may be variously combined and included in some embodiments but also variously omitted in other embodiments. Similarly, various requirements are described that may be requirements for some embodiments but not other embodiments.

Figure 1:
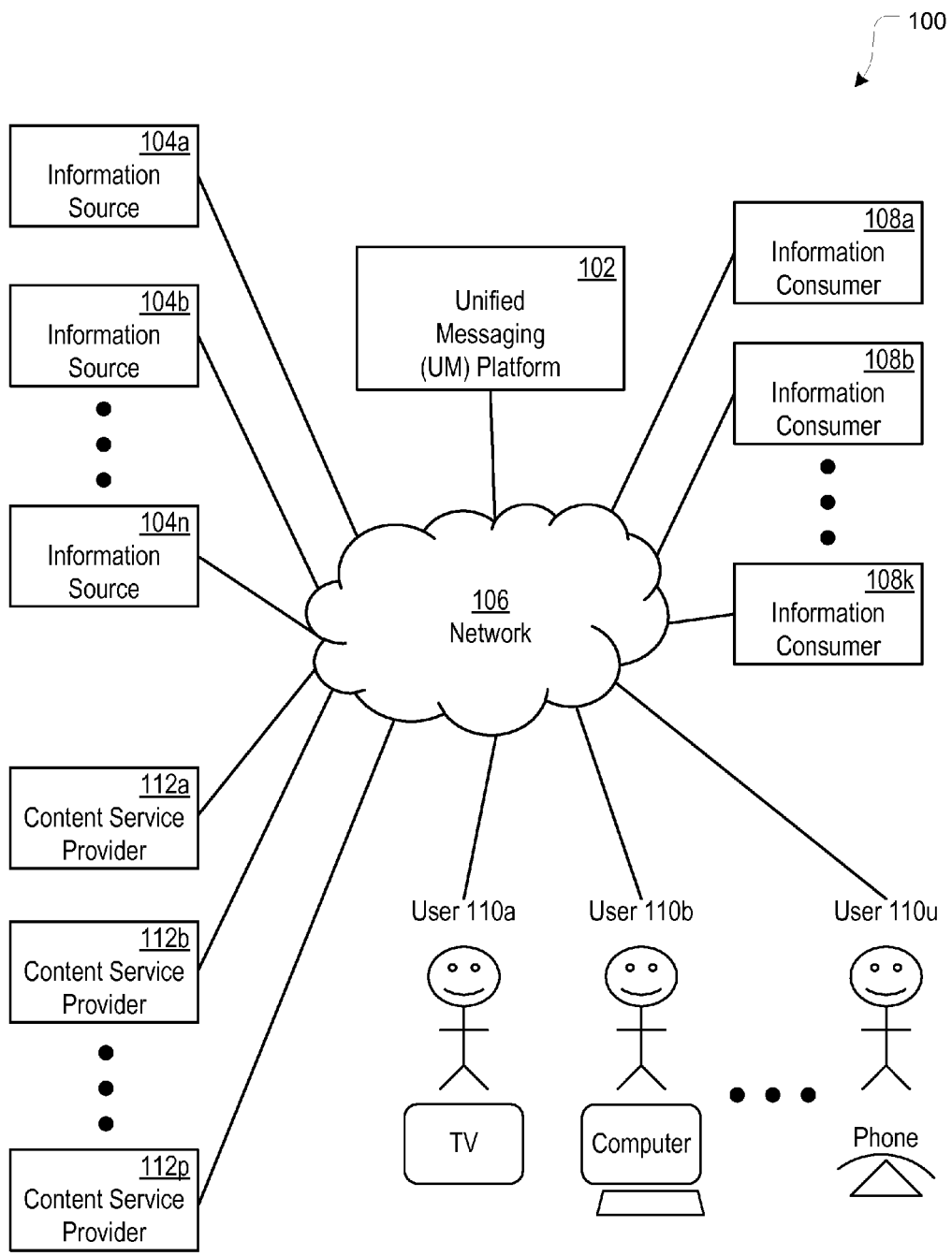
FIG. 1 illustrates a system in accordance with one embodiment.

FIG. 1 illustrates a system 100 including a unified messaging (UM) platform 102, one or more information sources 104a-n, one or more information consumers 108a-k, one or more content service providers 112a-p, one or more users 110a-u, and a network 106. There can be any number of information sources 104a-n, information consumers 108a-k, content service providers 112a-p, and users 110a-u. Network 106 can be one or more networks of different types and technologies, and is shown as one network 106 for conciseness. For example, network 106 may include various combinations of wireless networks, wired networks, private networks, and public networks using various technologies such as local area networks (LANs), wider area networks (WANs), etc. Each information source 104a-n, information consumer 108a-k and content service provider 112a-p may include one or more computers, databases, and content repositories, which are not shown for conciseness. Such components may be co-located and/or distributed and may be interconnected using private and/or public networks using various technologies. Content is used herein to refer to any information, which may be rendered to a user 110a-u over any medium, including, but not limited to, audio messages, video messages, text messages, web pages, TV programming, TV program listings, video-on-demand (VOD) listings, advertisements, etc. Media over which content can be delivered to users 110a-u include, but are not limited to, public networks (e.g., the network known as the internet), private networks, wired networks, wireless networks, telephone networks, packet-switched networks, circuit-switched networks, etc. Network 106 may be any combination of such networks. In one embodiment, the network 106 may include dedicated communication channels between components in the system 100. Each information source 104a-n, information consumer 108a-k and content service provider 112a-p may be internal or external to the UM platform 102. Each information source 104a-n, and/or information consumer 108a-k and/or content provider 112a-p may be combined and rearranged in any fashion, and may be provided by the same or distinct organizations. Content service providers 112a-p can be the same as information consumers 108a-k, but are shown separately to acknowledge that information consumers 108a-k may use information from the UM platform 102 in ways other than delivering content to users 110a-u. Examples of such information consumers 108a-k can include auditing systems. UM platform 102 can provide messaging services to users 110a-u.

Examples of messages that UM platform 102 can support include, but are not limited to, voicemail, email, facsimile, and video. Such messages can be generally categorized as textual messages (which include text) and multimedia messages (which can include audio, video and, possibly, text). Users 110a-u interact with the UM platform 102 through network 106 using telephone user interfaces (TUIs), computer browser interfaces, IP TV services, computer software applications, mobile smartphone applications, mobile phone applications, etc. The UM platform 102 can provide a mailbox where a user 110a-u can receive and manage multiple types of messages, including email, voice mail, video mail, wireless voicemail, and faxes. The mailbox may be accessed from a variety of devices, including, but not limited to, for example, any compatible computer with network access, any IP TV platform, or any touchtone telephone. For example, the UM platform 102 can allow users 110a-u to listen to, forward and compose voicemails; review, forward or print faxes; read, forward and compose emails. The UM platform 102 may eliminate or reduce the need to check multiple voicemail or answering machines, fax machines, email inboxes, video mailboxes, etc. The UM platform 102 can include one or more application programming interfaces (APIs) to allow client applications (not shown), information sources 104a-n, information consumers 108a-k and content service providers 112a-p to communicate with and request services from the UM platform 102.

UM platform 102 can collect both static (e.g., subscription profile data) and dynamic (e.g., from messages that appear in its subscribers' mailboxes, its subscribers' communications with the UM platform 102 interfaces, etc.) information about its subscribers (users 110a-u). In one embodiment, UM platform 102 may search the texts of the emails, other text-based messages, and any text files that may be in the users' 110a-u mailboxes. Additionally or alternatively, in another embodiment, UM platform 102 can apply text-conversion programs to other messages and/or files in the users' 110a-u mailboxes to collect textual information about such users 110a-u. Examples of conversion programs include character recognition (CR) programs that may be applied to facsimile messages and files, as well as speech-to-text (STT) programs that can be applied to audio portions of multimedia messages and files. In at least one embodiment, UM platform 102 can use such information that the UM platform 102 can collect about users 110a-u, and/or information that the UM platform 102 may receive from information sources 104a-n to customize the service that it renders to its users 110a-u. In at least another embodiment, UM platform 102 can use the source information (e.g., caller's phone number, caller's area code, caller's country code, email sender's domain part of email address, facsimile senders' phone numbers, facsimile senders' area codes, facsimile senders' country codes, etc.) from the messages that it receives to determine additional information of interest about its users 110a-u. In at least another embodiment, UM platform 102 can send data to information consumers 108a-k and/or content service providers 112a-p based on such information that the UM platform 102 can collect about users 110a-u, and/or information that the UM platform 102 may receive from information sources 104a-n. Information consumers 108a-k and content service providers 112a-p may use such received information to improve their knowledge about users 110a-u. In at least another embodiment, UM platform 102 may use the information that it collects about its users 110a-u to render its own advertising to users 110a-u (e.g., in exchange for free messaging service or reduced-cost messaging service) over any of its interfaces, such as telephone user interface, internet browser interface, smart phone application clients, etc.

The information sources 104a-n provide information to the UM platform 102 about users 110a-u. Such information may include, but not be limited to, any or all of the following: information retrieval patterns (e.g., time of day statistics for content retrieval, nature of the content that is retrieved, etc.), information usage patterns (e.g., specific services that are used (e.g., email, searches, VOD downloads, remote device management, etc.), demographics (e.g., age, location, race, gender, etc.), and locations (current, previous, historical, etc.)). Examples of information sources 104a-n can include (without limitation and among others) the AT&T U-verse service, AT&T U-verse portal servers, AT&T mobility wireless servers, search engine servers, etc. UM platform 102 may use the information that it receives from information sources 104a-n to render its own advertising to users 110a-u (e.g., in exchange for free messaging service or reduced-cost messaging service) over any of its interfaces, such as telephone user interface, internet browser interface, smart phone application clients, etc.

Information consumers 108a-k receive from the UM platform 102 information that may be useful to them and/or their partners. Examples of information consumers 108a-k include, but are not limited to, AT&T wireless servers, mobile browser servers, WiFi hot-spot gateways and/or servers, IP TV VOD listing servers, IP TV ad-insertion servers, the AT&T U-verse portal, AT&T mobility text messaging servers, security audit servers, etc. Information consumers 108a-k may inquire from UM platform 102 specific information about users 110a-u and/or all users, periodically and/or at specific times. Such information transmissions from the UM platform 102 to information consumers 108a-k may be on-demand from information consumers 108a-k and/or periodically. Information consumers 108a-k may use such information from the UM platform 102 to prioritize and customize content that they may deliver to their users 110a-u. Information consumers 108a-k can use any statistical algorithms to rank their information for their services to users 110a-u, based on the information they receive from UM platform 102.

Content service providers 112a-p provide to users 110a-u content such as, but not limited to, IP TV program listings, IP TV programming, VOD programming, VOD listings, dynamic advertising insertion into TV programming advertising time slots, multimedia user interfaces (e.g., video phone, computer-based IP phone service, etc.), etc. Content service providers 112a-p receive from the UM platform 102 information that may be useful to them and/or their partner services. Content service providers 112a-p may inquire from UM platform 102 specific information about users 110a-u and/or all users, periodically and/or at specific times. Such information transmissions from the UM platform 102 to content service providers 112a-p may be on-demand from content service providers 112a-p and/or periodically. Content service providers 112a-p may use such information from the UM platform 102 to prioritize and customize content that they may deliver to their users 110a-u. For example, an IP TV ad insertion engine may prioritize tourism and travel advertisements about Europe over its other advertisements for a user 110a-u, who receives most of his voicemails from Germany and/or emails from an organization in Switzerland. As another example, a content service provider 112a-p VOD server may rearrange (e.g., reorder) its display of available downloads to emphasize recorded football play-off games, if the UM platform 102 has detected the word football in recorded voicemails during the last 3 hours. Content service providers 112*a-p* can use any statistical algorithms to rank their information for their services to users 110*a-u*, based on the information they receive from UM platform 102. For example, in one embodiment, an IP TV content service provider 112*a-p* may rearrange the most likely programs to be displayed in its featured program listings to users 110*a-u* by using the keywords that it receives from UM platform 102 and the information that it may have about its complete list of available programs. In another embodiment, a content service provider 112*a-p* may rearrange the list of commercials to be displayed to one or more users 110*a-u* by using the keywords that it receives from UM platform 102.

Information sources 104*a-n*, information consumers 108*a-k*, and content service providers 112*a-p* may be provided by the same or different organizations in any combination. For example, an information source 104*i* may belong to and/or be managed by organization O1, whereas information consumer 108*j* may belong to and/or be managed by organization O2, and content service provider 112*m* may belong to and/or be managed by an organization O3, where O1, O2 and O3 may be anywhere from one to three different organizations. Letters in the information source 104*a-n*, information consumer 108*a-k*, content service provider 112*a-p* and users 110*a-u* are used to indicate multiplicities of numbers, and such numbers do not have to be the same. For example, there can be two information sources 104*a-n*, five information consumers 108*a-k*, one content service provider 112*a-p*, and millions of users 110*a-u*. Users 110*a-u* may be fixed-location users and mobile users.

In one embodiment, the UM platform 102 provides sophisticated backward-compatible changes to the existing architecture of the UM platform 102 to provide tangibly attractive and financially rewarding new revenue streams to the UM platform 102 by providing services for information consumers 108*a-k* and/or content service providers 112*a-p*. The UM platform 102 can provide significant convergent "search-engine"-like multimedia services to information source 104*a-n* and content service provider 112*a-p* with respect to fixed and mobile users 110*a-u*.

In one embodiment, an API of the UM platform 102 may be designed to allow suppliers of advertisements to pay the UM platform 102 to provide and insert any type of advertisement (e.g., sound, visual, multimedia, interactive, static, etc.) in messages retrieved by users 110*a-u* during, or contemporaneous with, message retrieval by the users 110*a-u*. In one embodiment, the advertisements may include rebate offers, incentives, cash back information, coupons, or any other kind of promotional information. The suppliers of advertisements may be any company or entity that desires to display or otherwise publish advertising. In one embodiment, the suppliers of advertisements may include advertisers that offer goods or services. In one embodiment, the suppliers of advertisements may include the information sources 104*a-n*.

In one embodiment, an API of the UM platform 102 may be designed to allow the client applications such as information source 104*a-n* to specify or otherwise provide profile information to the UM platform 102, such as, for example, categories of interest areas, keywords of interest, and/or demographical information. The UM platform 102 may analyze the profile information to create a profile for the users 110*a-u* and to select an advertisement or advertisements to publish to the users 110*a-u*.

An information consumer 108*a-k* can receive one or more word sets and subscriber (user 110*a-u*) profile information from the UM platform 102. Upon receiving each such word set and optional subscriber profile parameters, an information consumer 108*a-k* can customize the content that it presents to each user 110*a-u*. Such customizations can include, but are not limited to, rearranging the presentations of currently available VOD programming, future available VOD programming, advertisements to be inserted using one or more ad-server engines for IP TV platforms (not shown), advertisements to be inserted using one or more application servers for web browser interfaces, and/or advertisements to be inserted using one or more application servers for mobile devices such as mobile PDAs.

The UM platform 102 can also render advertising messages to its users 110*a-u*, who may access messages in the UM platform 102 using one or more interfaces such as one or more subscriber web browser interfaces (SBIs), telephone user interfaces, stationary phone applications (such as Voice Over IP softphones) and other applications (such as applications on smart mobile phones). In one embodiment, presentation layers of the UM platform 102, such as the SBI and the TUI, may be designed to consult a class of service (COS) profile of each user 110*a-u* (which can be influenced by the information sources 104*a-n* using one or more APIs of the UM platform 102, if administratively allowed). The presentation layers of the UM platform 102 may present or otherwise publish advertisements to users, as appropriate. For example, a user may agree to listen to one advertisement per phone-in (when the user retrieves messages) in exchange for free service or lower-priced service. The supplier of the advertisement may be separately charged by the UM platform 102 for the advertisement per a service agreement. As another example, sponsored advertisements may be invoked (clicked) in the SBI portal, and the supplier of the advertisement may be charged accordingly. As another example, any contact with the supplier of the advertisement, or the occurrence of a transaction with the supplier of the advertisement, may result in a charge to the supplier. It will be appreciated that the UM platform 102 may generate advertising-related revenues in a variety of manners. In one embodiment, a folder structure of the UM platform 102 may be designed to include a "free-ad" folder for each user.

In one embodiment, the UM platform 102 may use one or more central subscription profiles of users 110*a-u* (e.g., by using the Member Account Manager in the U-verse platform, and/or the Home Subscriber System (HSS) in Internet Protocol Multimedia Subsystem, etc.), and its own subscriber information to influence ranking and weighing of categories of interest of the user 110*a-u* to select appropriate advertisements for the user 110*a-u*. In one embodiment, a weighing or ranking algorithm can be provided to the UM platform 102 by the client applications such as the information source 104*a-n*.

Figure 2:
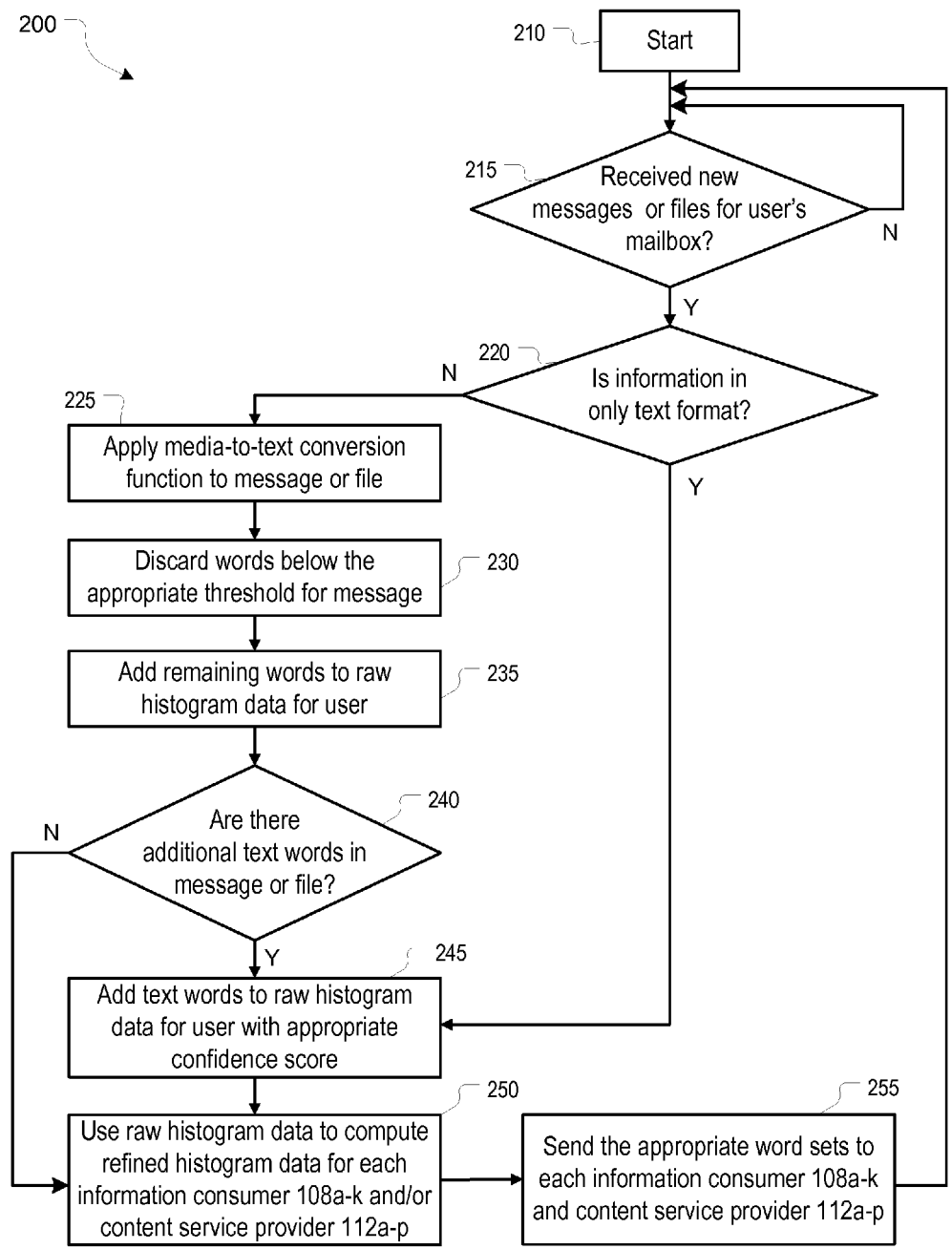
FIG. 2 illustrates a method in accordance with one embodiment.

FIG. 2 is a flow chart of a method 200 of operation of a system 300 which may be used to implement parts of or all of the UM platform 102. Thus, in at least one embodiment, the method 200 may be implemented by the UM platform 102. As described earlier, some of the APIs of UM platform 102 can be bidirectional, and allow for information exchange between the UM platform 102 and any of the components such as information sources 104*a-n*, information consumers 108*a-k*, and content service providers 112*a-p*. As described earlier, any and all of information consumers 108*a-k*, content service providers 112*a-p* and UM platform 102 can provide content to users 110*a-u*. For conciseness, in one embodiment, information sources 104*a-n* send information to UM platform 102, and information consumers 108*a-k* and content service providers 112*a-p* receive information about users 110*a-u* from the UM platform 102. It is to be understood that information sources 104*a-n*, information consumers 108*a-k*, content service providers 112*a-p* and UM platform 102 can be combined, separated and arranged in any manner without limiting the scope or the intent of the technology being disclosed herein. In one embodiment, an API of the UM platform 102 may be designed such that the UM platform 102 can send certain keywords about one or more users 110a-u of the UM platform 102 to one or more interested information consumers 108a-k and/or content service providers 112a-p. In at least one embodiment, such data transfer from the UM platform 102 is based on a pull technology, whereby an information consumer 108a-k or content service provider 112a-p may request such information at various times (periodically or as needed). In at least one other embodiment, the UM platform 102 may transfer such information to one or more information consumers 108a-k and/or content service providers 112a-p based on a push model, whereby the UM platform 102 sends such information when it chooses to.

UM platform 102 may use a variety of mechanisms to determine keywords of interest to transfer to information consumers 108a-k and/or content service providers 112a-p. In one embodiment, UM platform 102 can be configured with at least one of the following information about its users 110a-u, information consumers 108a-k and content service providers 112a-p: one or more character recognition (CR) thresholds (CR_Ts), one or more speech-to-text (STT) thresholds (STT_Ts), preferred language(s) of the primary and secondary (if any) mailbox(es) associated with the mailboxes of such users 110a-u, maximum number of keywords for each user 110a-u to be sent to an information consumer 108i or content service provider 112j, and a list of words of interest for each information consumer 108a-k and/or content service provider 112a-p. Such information can be configured into UM platform 102 using one or more APIs and/or interactive applications (not shown). UM platform 102 may also receive presence information from a presence server (not shown) to determine the current location of each such user 110a-u. In at least one embodiment, the UM platform 102 may also use the Home Subscriber Service (HSS) (not shown) and/or other repositories of user information (not shown) to collect data in order to rank keywords of interest for each user 110a-u. In at least one additional or alternative embodiment, the UM platform 102 may transmit other parameters of interest such as current location information (derived from a presence server that is not shown), zero or more elements of the subscribers' profiles such as preferred languages (e.g., English, Spanish, etc.) for the subscribers' primary and secondary mailboxes (if any), etc. to zero or more information consumers 108a-k and/or content service providers 112a-p. Collectively, such data are referred to as additional subscriber parameters herein. In at least one embodiment, UM platform 102 can use an STT service to create text transcriptions of one or more multimedia messages or files for its users 110a-u. Multimedia messages may include audio components of voicemail messages, audio components of video-mail messages, and/or multimedia files that the user 110a-u may receive and/or store on the UM platform 102. In at least another alternative or additional embodiment, UM platform 102 can use a CR mechanism to create text representations of one or more facsimile documents in each mailbox of users 110a-u. Facsimile, audio, video, text and other documents may be stored in mailboxes of users 110a-u as files and/or attachments to messages. UM platform 102 can use method 200 to transmit information about users 110a-u to zero or more information consumers 108a-k and/or content service providers 112a-p. Method 200 can be used to identify relevant keywords, based on precise text and approximated multimedia and facsimile content, and send limited numbers of them to information consumers 108a-k and/or content service providers 112a-p about users 110a-u.

Method 200 starts in step 210, and may be executed separately for each user 110a-u. In step 215, UM platform 102 determines whether it has received a new file or message for a user 110a-u. If no such message or file has been received, method returns to step 215 where it awaits arrivals of new messages and/or files. If UM platform 102 has received a message for a user 110a-u, the method moves to step 220, where UM platform 102 determines whether the contents of the message or file are only in text format. Examples of such information include text documents such as word processing documents, email messages, text messages, etc. If the received message or file is in text format, the method proceeds to step 245. If UM platform 102 receives a file or message that is not in text format or also has one or more non-text (e.g., audio, video and/or facsimile components), the method proceeds to step 225. In step 225, UM platform 102 can apply to one or more conversion algorithms to convert the message or file contents to text format. Such conversions are typically based on approximation and estimation algorithms, and are often not precise. Therefore, beneficial methods must be devised to use the converted information. For example, an STT function can be applied to the audio portion of a multimedia message or file that UM platform 102 has received for the user 110a-u. UM platform 102 may also apply one or more CR algorithms to facsimile messages that it receives for users 110a-u. The text information that is generated in step 225 may include a separate series of characters, where each such continuous string can have a confidence score between 1 and 100 assigned to it. For example, a "," (comma) character may be associated with a confidence score of 30, and a contiguous string sequence "door" may be represented as a word with a confidence score of 70. The method then proceeds to step 230. In step 230, UM platform 102 can use an appropriate threshold such as an STT_T or a CR_T to discard words whose confidence scores are below desirable threshold values. In at least one embodiment, UM platform 102 may use the same STT_T and CR_T values for all of the information consumers 108a-k and content service providers 112a-p. In at least another embodiment, UM platform 102 may use separate STT_T and CR_T values for each of the information consumers 108a-k and content service providers 112a-p. The method then proceeds to step 235. In step 235, UM platform 102 includes the words that are above the appropriate threshold to a raw histogram data set for a user 110a-u. A raw histogram is simply a list of words that are found for a user 110a-u from text information or using conversion schemes (e.g., using STT and/or CR schemes) along with the number of times that each such word has been found for that user 110a-u. In at least one embodiment, UM platform 102 in step 235 also stores in the raw histogram an individual confidence score for each occurrence of such words. In at least one other embodiment, UM platform 102 in step 235 only stores in the raw histogram the count of the number of times that each word has been encountered and not discarded in a prior step. The method proceeds to step 240. If there are additional text words in the message or file (e.g., in the body of an email whose multimedia attachment file was analyzed in prior steps 225 to 235), UM platform 102 can include such words with appropriate confidence scores (e.g., with confidence score of 100 for each such word) in the raw histogram data for user 110a-u. In at least one embodiment, punctuation marks are not stored in the raw histogram. The method then proceeds to step 250. Also, if no additional words were found in step 240, the method would proceed from step 240 to step 250. In step 250, UM platform 102 can create a customized refined histogram for user 110a-u for one or more information consumers 108a-k and/or content service providers 112a-p. In at least one embodiment, the refinement procedure may involve selecting only those words of interest from a list that an information consumer 108a-k or content service provider 112a-p has previously specified to UM platform 102 for a specific user 110a-u. In at least one other alternative embodiment, the refinement procedure may involve selecting only those words of interest from a list that an information consumer 108a-k or content service provider 112a-p has previously specified to UM platform 102 for all users 110a-u. In at least one other alternative or additional embodiment, the refinement procedure may include sorting the words in the raw histogram data based on the frequencies of occurrences of such words in the mailbox of a user 110a-u. The method then proceeds to step 255. In step 255, UM platform 102 selects an appropriate word set and sends this (these) word set(s) to each information consumer 108a-k and/or content service provider 112a-p that is to receive such information. In at least one embodiment, the numbers (zero or more) of such words are specified by the information consumer 108a-k and/or content service provider 112a-p for each individual user 110a-u. In at least one alternative embodiment, the numbers (one or more) of such words are specified by the information consumer 108a-k and/or content service provider 112a-p for all users 110a-u. UM platform 102 sends the selected words for user 110a-u to each information consumer 108a-k and/or content service provider 112a-p, as appropriate. The method then proceeds to step 215, where it can process additional messages and/or files. If one or more content, file or attachment were found previously and had not yet been processed in the other steps of method 200, each one is processed just like new messages and files starting in step 210.

Information consumers 108a-k and content service providers 112a-p can use the keyword information that they receive from UM platform 102 to deliver customized and beneficial information to users 110a-u using any of the convergent services such as customized IP TV program listings, customized IP TV VOD listings, computer interfaces (e.g., using web servers) and telephone user interfaces. Some such information content that is delivered to users 110a-u may be in the form of customized advertisements. For example, one or more ad-insertion servers (not shown) may insert such customized advertisements. Users 110a-u may use any of the various convergent (e.g., internet web browsing, TV, phone, etc.) services with contents that are customized for them.

In one embodiment, a user receives more targeted and favorable content when retrieving messages through convergent presentation services.

In one embodiment, users may observe more relevant and targeted content based on information from the UM platform 102. The UM platform 102 may provide "search engine"-like services using convergent communication platforms. The UM platform 102 may be useful to a wide array of customers such as small businesses and mass market customers. The UM platform 102 may encourage users (e.g., small business and consumers) to use the UM platform 102 for free or reduced fees in exchange for some advertising services. The UM platform 102 provides additional convergence among the various information source 104a-n, information consumer 108a-k and content service provider 112a-p applications.

In one embodiment, the services provided by the UM platform 102 may be hosted, licensed, or sold.

Figure 3:
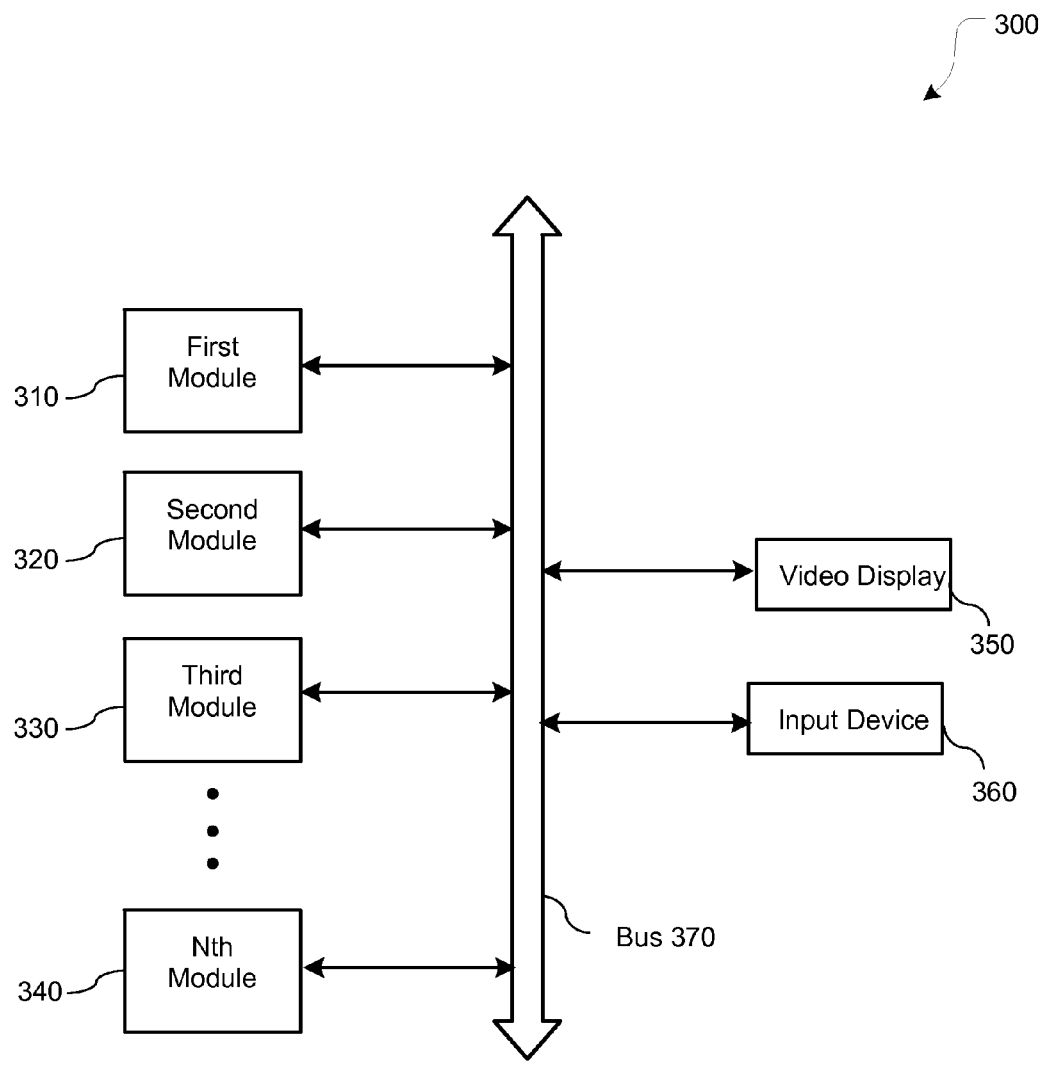
FIG. 3 illustrates a block diagram of a system in accordance with one embodiment.

FIG. 3 illustrates a block diagram of one embodiment of a system 300 of the present invention. The system 300 includes a first module 310, a second module 320, a third module 330, an Nth module 340, a video display 350, and an input device 360 coupled together through a bus 370. As illustrated, the system 300 includes the modules 310, 320, 330, 340 in one embodiment. In one embodiment, any number of modules can be implemented.

In one embodiment, the routines, steps, and functional blocks executed to implement the embodiments of the disclosure and all of the aforementioned features of the present invention may be variously implemented as computer modules 310, 320, 330, 340. In one embodiment, these computer modules can be a sequence of instructions referred to as "computer programs."

In one embodiment, user input is provided to one or more of the modules using an input device 360. The input device 360 may be a keyboard, cursor control device, or voice recognition system, for example. In another embodiment, more than one input device may be used. In one embodiment, module output is displayed using a video display 350.

Figure 4:
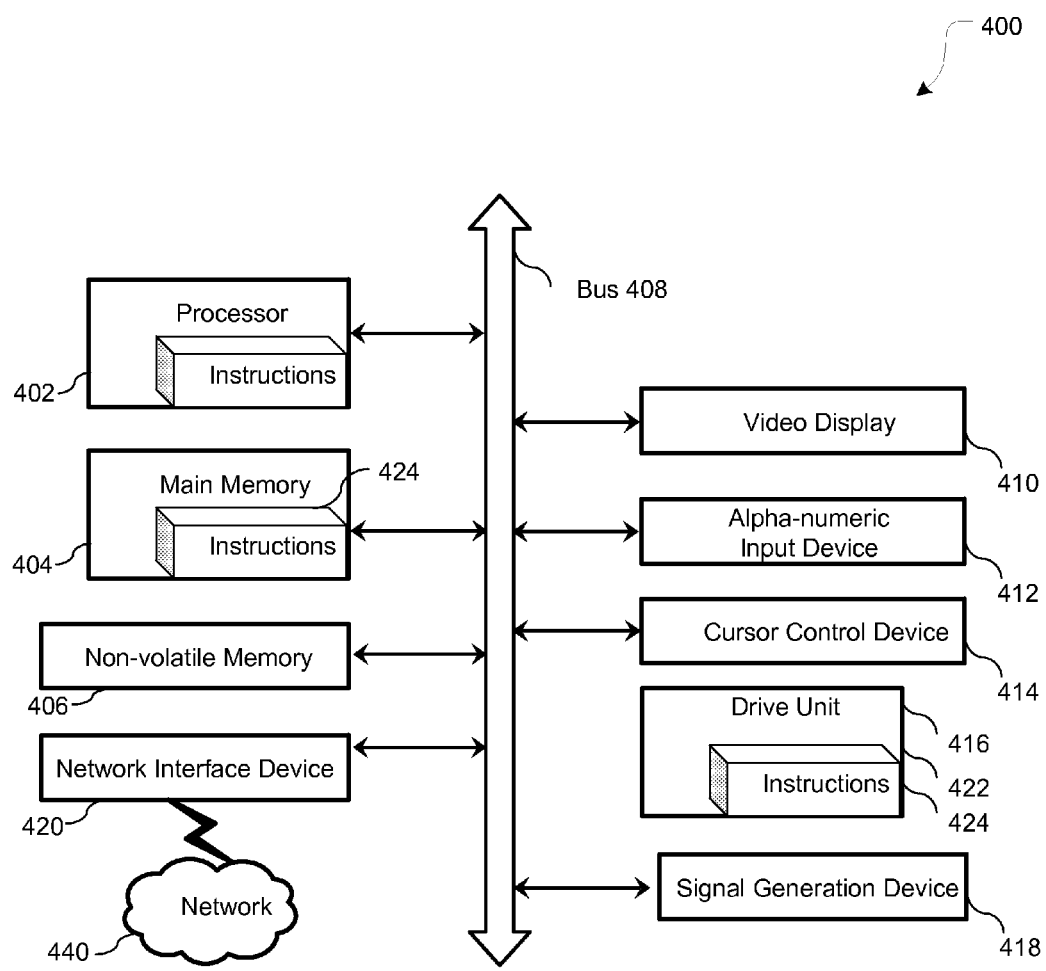
FIG. 4 illustrates a diagrammatic representation of a machine in an exemplary form of a computer system in accordance with one embodiment.

FIG. 4 shows a diagrammatic representation of a machine in an exemplary form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment. In one embodiment, the machine communicates with the server to facilitate operations of the server and/or to access the operations of the server.

The computer system 400 can include a processor 402 (e.g., a central processing unit (CPU), a graphics processing unit (GPU), or both), a main memory 404 and a nonvolatile memory 406, which communicate with each other via a bus 408. In some embodiments, the computer system 400 may be a laptop computer, personal digital assistant (PDA) or mobile phone, for example. The computer system 400 may further include a video display unit 410 (e.g., a liquid crystal display (LCD) or a cathode ray tube (CRT)). The computer system 400 also includes an alphanumeric input device 412 (e.g., a keyboard), a cursor control device 414 (e.g., a mouse), a disk drive unit 416, a signal generation device 418 (e.g., a speaker) and a network interface device 420. The disk drive unit 416 can include a machine-readable medium (or computer readable medium) 422 on which is stored one or more sets of instructions (e.g., software 424) embodying any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media. The software 424 may further be transmitted or received over a network 440 via the network interface device 420.

While the machine-readable medium (computer readable medium) 422 is shown in an exemplary embodiment to be a single medium, the term "machine-readable medium" or "computer-readable medium" should be taken to include a single medium or multiple media (e.g., a centralized or distributed database, and/or associated caches and servers).

In one embodiment, each of the UM platform 102, information consumers 108a-k, content service providers 112a-p, and the information sources 104a-n may be implemented as one or more instances of the system 300 and/or the computer system 400.

An embodiment of the invention relates to a computer storage product with a computer-readable or machine-accessible medium having executable instructions or computer code thereon for performing various computer-implemented operations. The term "computer-readable medium" or "machine-accessible medium" is used herein to include any medium that is capable of storing or encoding a sequence of executable instructions or computer code for performing the operations described herein. The media and computer code can be those specially designed and constructed for the purposes of the invention, or can be of the kind well known and available to those having ordinary skill in the computer software arts.

Examples of computer-readable media include computer-readable storage media such as: magnetic media such as hard disks, floppy disks, and magnetic tape; optical media such as Compact Disc-Read Only Memories ("CD-ROMs"), DVDs, and holographic devices; magneto-optical media such as optical disks; and hardware devices that are specially configured to store and execute program code, such as Application-Specific Integrated Circuits ("ASICs"), Programmable Logic Devices ("PLDs"), Read Only Memory ("ROM") devices, and Random Access Memory ("RAM") devices. Examples of computer code include machine code, such as produced by a compiler, and files containing higher level code that are executed by a computer using an interpreter. For example, an embodiment of the invention may be implemented using Java, C++, or other programming language and development tools. Additional examples of computer code include encrypted code and compressed code. Another embodiment of the invention can be implemented in hard wired circuitry in place of, or in combination with, computer code.

In general, the routines, steps, and functional blocks executed to implement the embodiments of the disclosure and aforementioned features of the present invention may be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, operation or operations, to the objective, spirit, and scope of the invention. All such modifications are intended to be within the scope of the claims appended hereto. In particular, while the methods disclosed herein have been described with reference to particular operations performed in a particular order, it will be understood that these operations may be combined, sub-divided, or reordered to form an equivalent method without departing from the teachings of the invention. Accordingly, unless specifically indicated herein, the order and grouping of the operations are not limitations of the invention.

The invention claimed is:

1. A method comprising:

receiving, at system comprising a processor, a voice mail message directed to a user and a facsimile message associated with the user;

determining, by the processor, that the voice mail message is in an audio format;

determining, by the processor, that the facsimile message is in a non-text format;

converting, by the processor, using a character recognition program, the facsimile message from the non-text format to a text format, the text format of the facsimile message comprising a first plurality of continuous strings of characters;

converting, by the processor, the voice mail message from the audio format to the text format, the text format of the voice mail message comprising a second plurality of continuous strings of characters;

determining, by the processor, a first confidence score for a continuous string of characters of the first plurality of continuous strings of characters of the text format of the facsimile message and a second confidence score for a continuous string of characters of the second plurality of continuous strings of characters of the text format of the voice mail message, the first confidence score indicating a first level of certainty that the continuous string of characters associated with the facsimile message is an accurate representation of a corresponding continuous string of characters of the non-text format of the facsimile message and the second confidence score indicating a second level of certainty that the continuous string of characters associated with the voice mail message is an accurate representation of a corresponding continuous string of characters of the audio format of the voice mail message;

determining, by the processor, that the first confidence score for the continuous string of characters associated with the facsimile message is below a threshold value;

in response to determining that the first confidence score for the continuous string of characters associated with the facsimile message is below the threshold value, discarding, by the processor, the continuous string of characters associated with the facsimile message;

determining, by the processor, that the second confidence score for the continuous string of characters associated with the voice mail message is not below the threshold value;

in response to determining that the second confidence score is not below the threshold value, determining, by the processor, a number of times the continuous string of characters associated with the voice mail message occurs in the text format of the voice mail message and has occurred in at least a portion of other voice mail messages associated with the user without being discarded for being below the threshold value;

storing, by the processor, in a data set associated with the user, the continuous string of characters associated with the voice mail message along with the second confidence score and the number of times the continuous string of characters associated with the voice mail message occurs in the text format of the voice mail message and has occurred in the at least a portion of the other voice mail messages associated with the user without being discarded for being below the threshold value;

providing, by the processor, the data set to an information recipient for use by the information recipient to customize content presented to the user;

selecting, by the processor, based at least in part on the continuous string of characters associated with the voice mail message, an advertisement to publish to the user, wherein the advertisement to publish to the user is selected based further on at least one of a phone number of a caller associated with the voice mail message, an area code of the caller associated with the voice mail message, or a country code of the caller associated with the voice mail message;

receiving, by the processor, from the user, a request to retrieve the voice mail message;

in response to receiving the request, publishing, by the processor to the user, the advertisement selected based at least in part on the continuous string of characters associated with the voice mail message; and customizing, by the processor, based at least in part on the continuous string of characters associated with the voice mail message, a service provided to the user, wherein the service comprises providing program listings to the user and wherein customizing the service comprises rearranging a presentation of the program listings provided to the user based at least in part on the continuous string of characters associated with the voice mail message.

2. The method of claim 1, further comprising receiving, from an information source, information about the user.

3. The method of claim 2, wherein the information about the user provided by the information source comprises information retrieval patterns of the user, information usage patterns of the user, demographics of the user, and locations associated with the user.

4. The method of claim 2, wherein the advertisement to publish to the user is selected based at least in part on both the continuous string of characters associated with the voice mail message and the information about the user provided by the information source.

5. A non-transitory computer-readable medium storing instructions that, when executed by a processor of a system, cause the processor to perform operations comprising:

receiving a voice mail message directed to a user and a facsimile message associated with the user;

determining that the voice mail message is in an audio format;

determining that the facsimile message is in a non-text format;

converting, using a character recognition program, the facsimile message from the non-text format to a text format, the text format of the facsimile message comprising a first plurality of continuous strings of characters;

converting the voice mail message from the audio format to the text format, the text format of the voice mail message comprising a second plurality of continuous strings of characters;

determining a first confidence score for a continuous string of characters of the first plurality of continuous strings of characters of the text format of the facsimile message and a second confidence score for a continuous string of characters of the second plurality of continuous strings of characters of the text format of the voice mail message, the first confidence score indicating a first level of certainty that the continuous string of characters associated with the facsimile message is an accurate representation of a corresponding continuous string of characters of the non-text format of the facsimile message and the second confidence score indicating a second level of certainty that the continuous string of characters associated with the voice mail message is an accurate representation of a corresponding continuous string of characters of the audio format of the voice mail message;

determining that the first confidence score for the continuous string of characters associated with the facsimile message is below a threshold value;

in response to determining that the first confidence score for the continuous string of characters associated with the facsimile message is below the threshold value, discarding the continuous string of characters associated with the facsimile message;

determining that the second confidence score for the continuous string of characters associated with the voice mail message is not below the threshold value;

in response to determining that the second confidence score is not below the threshold value, determining a number of times the continuous string of characters associated with the voice mail message occurs in the text format of the voice mail message and has occurred in at least a portion of other voice mail messages associated with the user without being discarded for being below the threshold value;

storing, in a data set associated with the user, the continuous string of characters associated with the voice mail message along with the second confidence score and the number of times the continuous string of characters associated with the voice mail message occurs in the text format of the voice mail message and has occurred in the at least a portion of the other voice mail messages associated with the user without being discarded for being below the threshold value;

providing the data set to an information recipient for use by the information recipient to customize content presented to the user;

selecting, based at least in part on the continuous string of characters associated with the voice mail message, an advertisement to publish to the user, wherein the advertisement to publish to the user is selected based further on at least one of a phone number of a caller associated with the voice mail message, an area code of the caller associated with the voice mail message, or a country code of the caller associated with the voice mail message;

receiving, from the user, a request to retrieve the voice mail message;

in response to receiving the request, publishing, to the user, the advertisement selected based at least in part on the continuous string of characters associated with the voice mail message; and customizing, based at least in part on the continuous string of characters associated with the voice mail message, a service provided to the user, wherein the service comprises providing program listings to the user and wherein customizing the service comprises rearranging a presentation of the program listings provided to the user based at least in part on the continuous string of characters associated with the voice mail message.

6. The non-transitory computer-readable medium of claim 5, wherein the operations further comprise receiving, from an information source, information about the user.

7. The non-transitory computer-readable medium of claim 6, wherein the information about the user provided by the information source comprises information retrieval patterns of the user, information usage patterns of the user, demographics of the user, and locations associated with the user.

8. The non-transitory computer-readable claim 6, wherein the advertisement to publish to the user is selected based at least in part on both the continuous string of characters associated with the voice mail message and the information about the user provided by the information source.

9. A system comprising:

a processor; and a memory that stores instructions that, when executed by the processor, cause the processor to perform operations comprising:

receiving a voice mail message directed to a user and a facsimile message associated with the user, determining that the voice mail message is in an audio format, determining that the facsimile message is in a non-text format, converting, using a character recognition program, the facsimile message from the non-text format to a text format, the text format of the facsimile message comprising a first plurality of continuous strings of characters, converting the voice mail message from the audio format to the text format, the text format comprising a second plurality of continuous strings of characters, determining a first confidence score for a continuous string of characters of the first plurality of continuous strings of characters of the text format of the facsimile message and a second confidence score for a continuous string of characters of the second plurality of continuous strings of characters of the text format of the voice mail message, the first confidence score indicating a first level of certainty that the continuous string of characters associated with the facsimile message is an accurate representation of a corresponding continuous string of characters of the non-text format of the facsimile message and the second confidence score indicating a second level of certainty that the continuous string of characters associated with the voice mail message is an accurate representation of a corresponding continuous string of characters of the audio format of the voice mail message, determining that the first confidence score for the continuous string of characters associated with the facsimile message is below a threshold value, in response to determining that the first confidence score for the continuous string of characters associated with the facsimile message is below the threshold value, discarding the continuous string of characters associated with the facsimile message, determining that the second confidence score for the continuous string of characters associated with the voice mail message is not below the threshold value, in response to determining that the second confidence score is not below the threshold value, determining a number of times the continuous string of characters associated with the facsimile message occurs in the text format of the voice mail message and has occurred in at least a portion of other voice mail messages associated with the user without being discarded for being below the threshold value, storing, in a data set associated with the user, the continuous string of characters associated with the voice mail message along with the second confidence score and the number of times the continuous string of characters associated with the voice mail message occurs in the text format of the voice mail message and has occurred in the at least a portion of the other voice mail messages associated with the user without being discarded for being below the threshold value, providing the data set to an information recipient for use by the information recipient to customize content presented to the user, selecting, based at least in part on the continuous string of characters associated with the voice mail message, an advertisement to publish to the user, wherein the advertisement to publish to the user is selected based further on at least one of a phone number of a caller associated with the voice mail message, an area code of the caller associated with the voice mail message, or a country code of the caller associated with the voice mail message, receiving, from the user, a request to retrieve the voice mail message, in response to receiving the request, publishing, to the user, the advertisement selected based at least in part on the continuous string of characters associated with the voice mail message, and customizing, based at least in part on the continuous string of characters associated with the voice mail message, a service provided to the user, wherein the service comprises providing program listings to the user and wherein customizing the service comprises rearranging a presentation of the program listings provided to the user based at least in part on the continuous string of characters associated with the voice mail message.

10. The system of claim 9, wherein the operations further comprise receiving, from an information source, information about the user.

11. The system of claim 10, wherein the information about the user provided by the information source comprises information retrieval patterns of the user, information usage patterns of the user, demographics of the user, and locations associated with the user.

12. The system of claim 10, wherein the advertisement to publish to the user is selected based at least in part on both the continuous string of characters associated with the voice mail message and the information about the user provided by the information source.

* * * * *